Jan. 24, 1928. 1,657,051
P. WASCHE
PLOW HITCH
Filed April 30, 1926 2 Sheets-Sheet 2
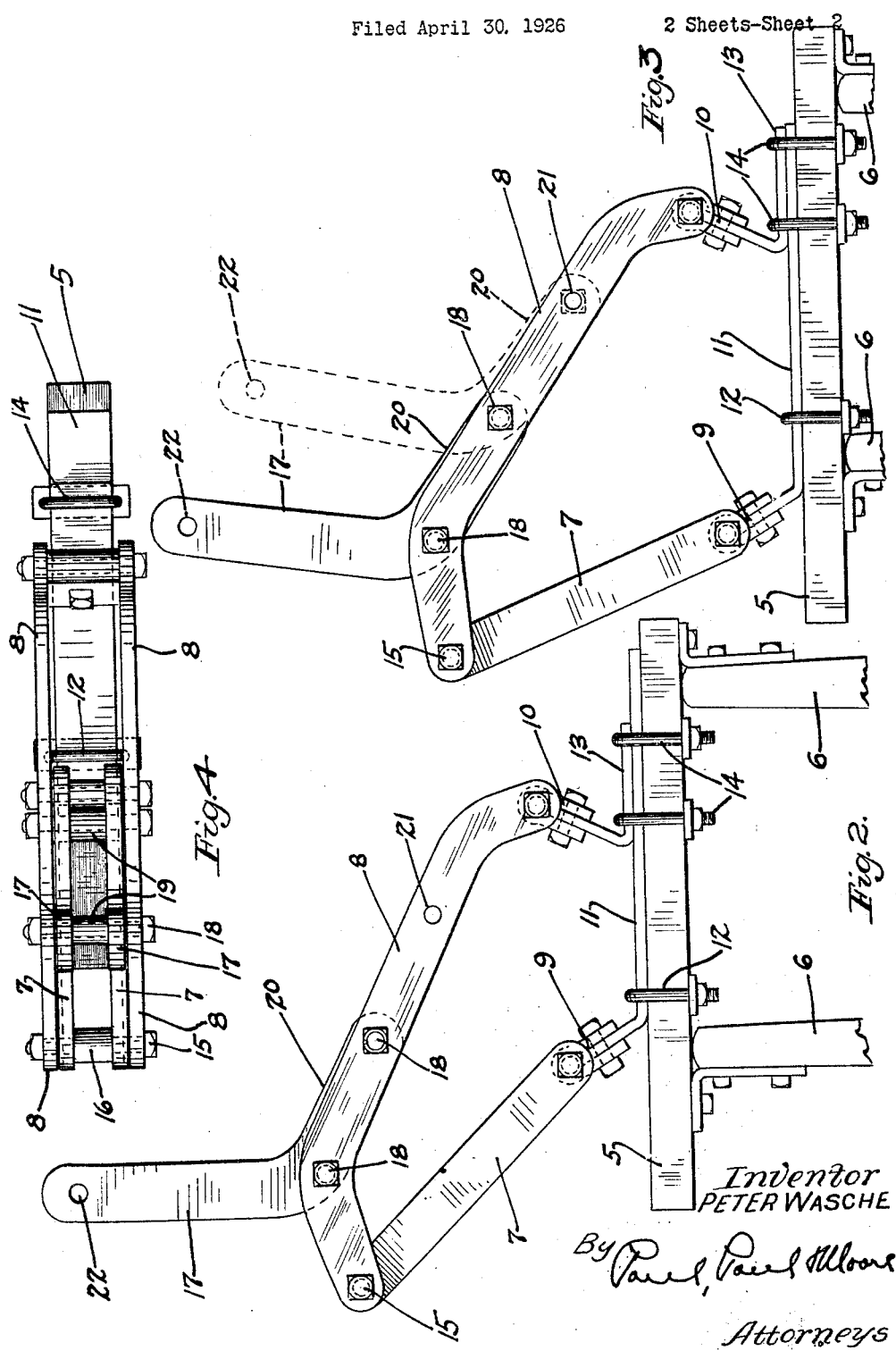
Inventor
PETER WASCHE
Attorneys Patented Jan. 24, 1928.

1,657,051

UNITED STATES PATENT OFFICE.

PETER WASCHE, OF PERHAM, MINNESOTA.

PLOW HITCH.

Application filed April 30, 1926. Serial No. 105,771.

This invention relates to an improved plow hitch particularly adapted for use in connection with gang plows and other implements to properly balance and equalize the lateral or side thrust of the implement, usually transmitted to the evener and whiffletrees thereof, and to which the draft animals are connected, whereby ample tug room will be provided for the animals, especially when three or more animals are harnessed to the implement in breast formation.

An object of the invention is to provide such a device of simple and inexpensive construction, having means for adjustably securing it to the forward end portion of a plow frame so that the point of connection between plow and evener may be laterally adjusted with respect to the plow, whereby the evener and whiffletrees may be properly alined with respect to the plow and furrows.

A further object of the invention is to provide a plow hitch comprising a pair of links adjustably secured to the frame of the plow, one of the links having a draft bar secured thereto and forwardly extending therefrom substantially parallel to the line of travel, whereby the evener will be spaced a considerable distance ahead of the plow frame and offset to one side thereof, thereby preventing the lateral thrust of the plow from being transmitted to the evener.

A further object is to provide a plow hitch adapted to be interposed between the plow frame and the evener and having means whereby the evener may be laterally adjusted with respect to the plow to cause the latter to follow the proper course, and whereby unnecessary strain and wear will be eliminated from the plow.

Other objects of the invention will appear from the following description and accompanying drawings and will be pointed out in the annexed claims.

In the drawings there has been disclosed a structure designed to carry out the various objects of the invention, but it is to be understood that the invention is not confined to the exact features shown, as various changes may be made within the scope of the claims which follow.

In the accompanying drawings forming part of this specification:

Figure 2 is an enlarged detail plan view showing the device secured to the forward portion of the plow frame;

Figure 3 is a similar view showing the device adjusted to a different position with respect to the plow frame; and Figure 4 is a front view of Figure 2.

Figure 1:
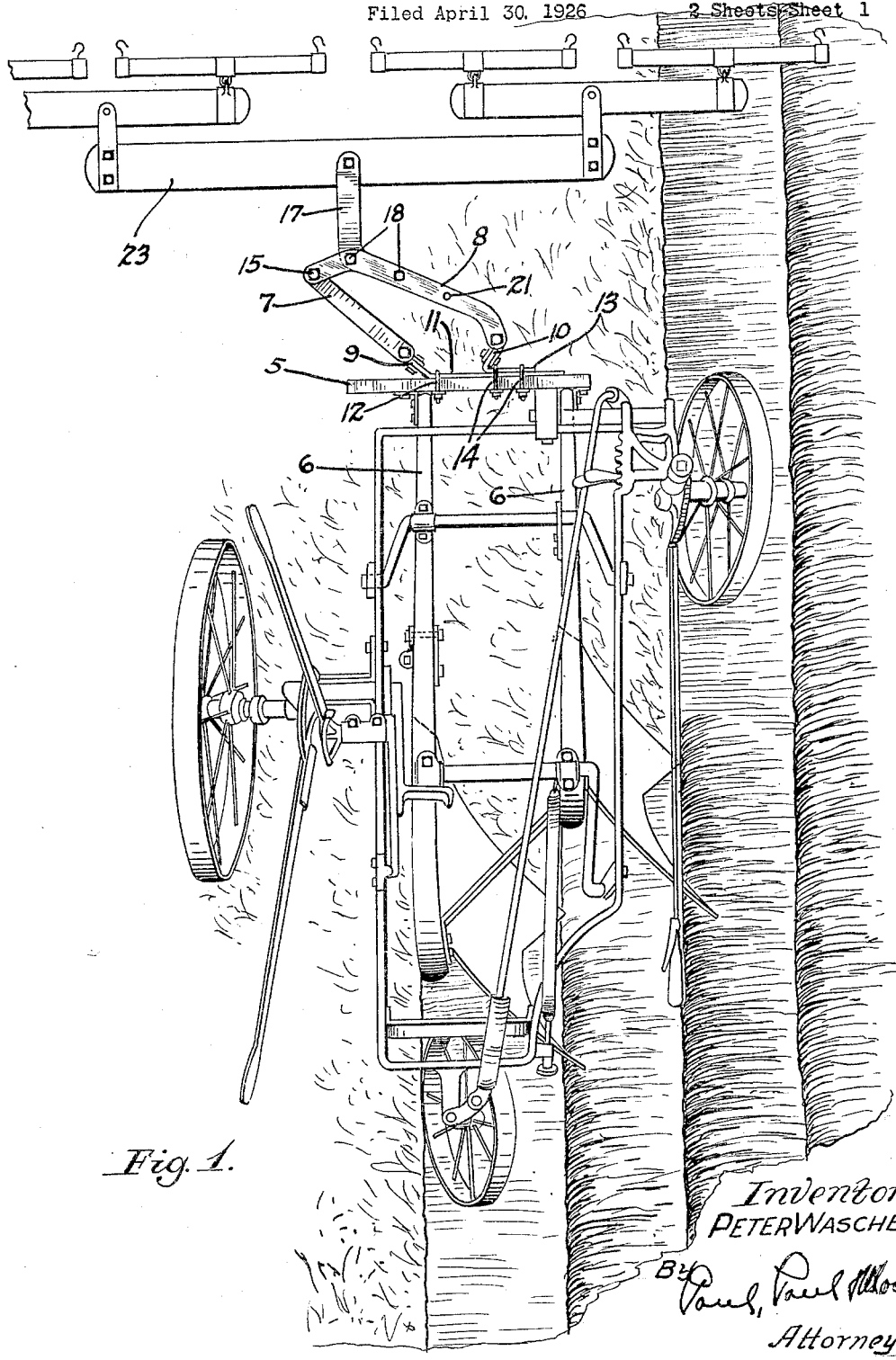
Figure 1 is a plan view of a common from of gang plow showing the invention applied thereto.

In the selected embodiment of the invention here shown, for purposes of disclosure, there is illustrated in Figure 1, a gang plow of ordinary construction, having the usual frame comprising a cross member 5 to which the usual plow beams 6 are secured. The cross member 5 provides means for securing the hitch to the plow frame.

The novel plow hitch featured in this invention comprises links 7 and 8 having their rear end portions pivotally connected to the cross member 5 by means of connections 9 and 10, respectively, as shown. The connection 9 is terminally provided upon one end of a bar 11 adapted to be adjustably secured to the cross member 5 by means of a U-bolt 12. The universal connection 10 is similarly provided upon one end of a relatively shorter bar 13 mounted upon the bar 11 and securely clamped thereagainst by means of similar U-bolts 14. By means of the bars 11 and 13, the pivotal connections of the links 7 and 8 with the cross member 5 may be relatively adjusted to and from each other to laterally adjust the hitch with respect to the plow frame. The outer ends of the links 7 and 8 are pivotally connected together by means of a bolt 15, and are preferably arranged in pairs as shown in Figure 4. The spaced links 7 are spaced apart at their outer ends by means of a sleeve 16 mounted upon the bolt 15 between the links as shown in Figure 4.

Spaced draft bars 17, having offset end portions 20, are secured to the relatively longer links 8 by means of bolts 18 as shown in Figures 2 and 3. Spacing collars 19 are preferably interposed between the draft bars 17 to space them apart as shown in Figure 4. These draft bars, it will be noted, are mounted between the link members 8 and are rigidly secured thereto by means of the bolts 18. A series of apertures 21 is provided in the spaced links 8 whereby the position of the draft bar 17 may be relatively adjusted thereon as shown in dotted lines in Figure 3. The forward ends of the spaced draft bars 17 are provided with apertures 22 to provide means for securing the usual evener 23 thereto as shown in Figure 1. By the employment of this novel hitch in connection with a gang plow, the point of connection between the evener and plow frame may be laterally adjusted so as to eliminate from the evener practically all side thrust. This will be clearly understood by referring to Figure 1, wherein it will be noted that when the hitch is operatively connected to the plow frame, it will be held against lateral movement with respect thereto as a result of the manner in which it is connected to the plow frame. The forward ends of the draft bars 17 are spaced from the relatively longer links 8, thereby spacing the evener 23 a considerable distance from the plow frame, with the result that practically all side thrust will be eliminated from the evener. The hitch also permits the evener to be laterally adjusted to allow the draft animal on the right hand side to follow the open furrow, which is preferable.

When three animals are used to draw the plow, the device may be adjusted to the full line position shown in Figure 3, or if necessary the draft bar 17 may be adjusted to the dotted line position shown in this same figure. The links 8 are preferably longer than the complementary links 7, thereby allowing the forward end of the draft bars 17 to be laterally adjusted with respect to the plow frame, by simply adjusting one of the bars 11 and 13 upon the cross member 5. Such a condition is shown in Figures 2 and 3, wherein it will be noted that the bar 11, to which the pivotal connection 9 is secured, has been relatively adjusted with respect to the relatively shorter bar 13 supporting the connection 10. Similarly, if the relatively shorter bar 13 is adjusted with respect to the bar 11, the forward end portion of the draft bars 17 may be shifted from side to side.

This novel plow hitch is therefore well adapted for use in connection with ordinary gang plows, or other implements normally having a side thrust. By means of the adjusting bars 11 and 13 and the links 7 and 8, the forward ends of the draft bars 17 may be laterally adjusted to adapt the hitch to practically all types of gang plows. Its construction is also such that it may readily be connected to plows of ordinary construction without any unnecessary changes or alterations of the plow frame. In the drawings, I have shown the hitch used in connection with an ordinary gang plow, but it is to be understood that I do not wish to limit its use to the particular type of plow shown, as it may be used as well in connection with disk plows, or other implements or ground working tools normally tending to transmit a side or lateral thrust to the evener when in use.

I claim as my invention:

1. A plow hitch, comprising in combination, a pair of bars, one longer than the other, adapted to be slidably and adjustably secured to the forward end of a plow frame, a pair of links pivotally connected to said adjusting bars, one of said links being relatively longer than the other link and having an offset end pivotally connected to the shorter link, spaced draft bars secured to said longer link and forwardly extending therefrom substantially parallel to the line of travel of said plow, said draft bars having their forward end portions spaced to receive an evener and having means for securing said evener thereto, the adjusting bars secured to said plow frame providing means whereby the forward end of said draft bars may be laterally adjusted with respect to the plow frame to prevent side thrust being transmitted to the evener.

2. A device of the class described having in combination, a pair of links, one of said links being longer than the other and having an offset forward end pivotally connected to said shorter link, means for pivotally connecting the rear ends of said links to the frame of a plow or analogous implement, whereby said links will be inclined laterally in one direction to the line of travel of said implement and a forwardly extending draft bar rigidly secured to the longer of said links intermediate its offset and rear ends.

3. In a device of the class described having in combination, a pair of links, one of said links being shorter than the other and extending substantially rectilinearly, the longer of said links having an offset forward end extending inwardly toward and pivoted to the forward extremity of said shorter link, means for adjustably and pivotally connecting the rear ends of said links to the frame of a plow or analogous implement, whereby said links will be inclined laterally in one direction to the line of travel of said implement, and the body portions thereof spaced apart, and a forwardly extending draft bar connected to the longer of said links intermediate its offset and rear ends.

4. A device of the class described, comprising a pair of links, pivoted to a cross member of a plow or analogous implement at widely spaced points and extending toward each other and being pivoted together at their free ends, one of said links being substantially straight and the other being of greater length than said straight link and being bent between its ends and having its ends disposed rearwardly and an angular draft bar having one leg thereof secured to the longer link between its ends and having another leg extending forwardly of said longer link approximately in the line of draft.

In witness whereof, I have hereunto set my hand this 27th day of April, 1926.

PETER WASCHE.